Patented Oct. 31, 1922.

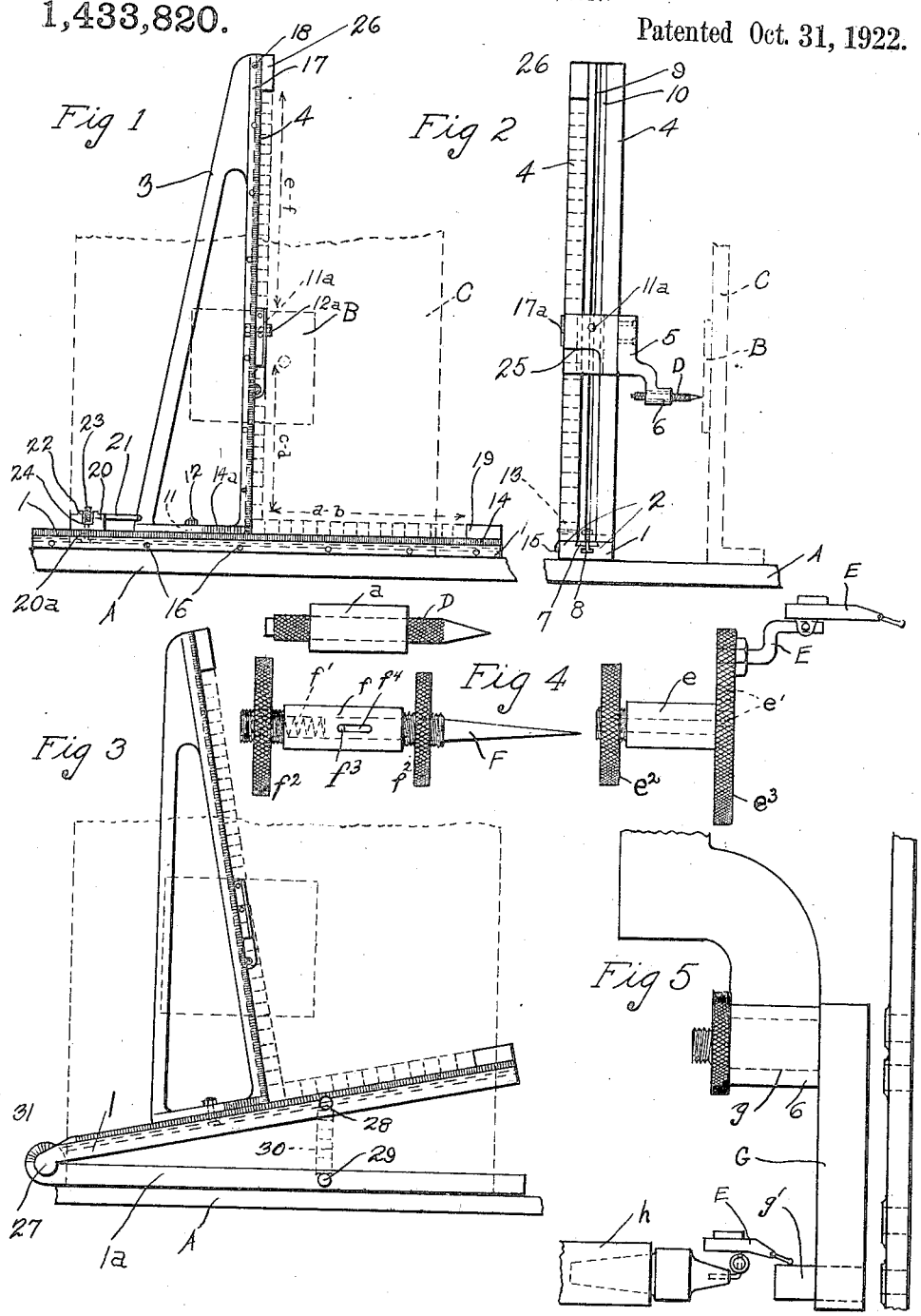

1,433,820

UNITED STATES PATENT OFFICE.

HENRY H. HUESMAN, OF DAYTON, OHIO.

UNIVERSAL GAUGE.

Application filed February 26, 1921. Serial No. 448,092.

*To all whom it may concern:*

Be it known that I, HENRY H. HUESMAN, a citizen of the United States, residing at Dayton, in the county of Montgomery and State of Ohio, have invented certain new and useful Improvements in Universal Gauges or the like, of which the following is a specification, reference being had therein to the accompanying drawings.

This invention relates to universal gauges, having particular reference to a locating and transferring instrument adapted for use in connection with lay-out work in building tools, as jigs, dies, fixtures, or the like.

With the universal gauge, certain well known tools or instruments in the toolmaking art, as an automatic center punch, scriber, variation indicator, etc., are adapted to be used interchangeably for locating centers on the work, or transferring measurements ascertained relative to the work by the adjustments effected by the gauge,—the advantages gained consisting in the saving of time and in insured accuracy in the work.

Thus with the use of the gauge and automatic center punch, a center can be located direct from the scale readings and transferred to the work without scribing intersecting lines on the work, and center punching at the point of intersection, as is common practice.

When the work is set up relative to the gauge, both vertical and horizontal positions can be determined in one setting of the gauge,—it will not be necessary therefore to turn the work 90° to effect adjustments of locating buttons, (known in this art as the button system for locating) as both vertical and horizontal adjustments can be effected direct from the gauge without changing the position of the work.

In jig or master plate layout work, where the button system is used in connection with the gauge, the true position of a center can be found simply by rotating the contact finger of an ordinary variation indicator, supported in the locating member of the gauge, around the locating button secured in a position of approximate accuracy on the work, and then adjusting the button until the indicator reading is at zero at all points, when the true center will have been found.

In very accurate work in which the setting of the gauge according to the scale adjustments thereof would not be accurate enough, provision is made for the use of hardened, ground and lapped locating blocks between which Johansson gauge blocks, or the like, can be used to ascertain either vertical or horizontal positions with great accuracy.

The use of the universal gauge makes unnecessary two planed or finished surfaces at right angles one with the other for locating and taking of dimensions, etc., which is now common practice, as with the horizontal and vertical adjustments of the gauge, only one such surface is required.

In very heavy work much time is saved, in the practice of the button system with the gauge, by rendering unnecessary the making of repeated settings of the buttons to locate true centers, etc, as with the work held in fixed relation to the gauge such adjustments can be made in a single setting by the convenient adaptability of a locating indicator. Also, as a further feature of adaptability to the requirements of the work, the locating indicator can be fixed in any position, or left free to revolve about any given center of the work.

Also, provision is made in the locating indicator holder for radial adjustment of the contact finger, giving a wide range to its adaptability,—thus the true position of a large boss, plug or hole may be ascertained, and, with the location found and transferred to the work, the true position of a smaller boss, plug or hole relative to the larger one can also readily be found. All work surfaces of the instrument bearing member of the gauge, as well as the corresponding work surfaces of the instruments are hardened, ground and lapped to insure great accuracy and minimum wear,—suitable devices, as knurled nuts, retainer screws, etc., being used to properly support the instruments relative to the work,—the construction in this respect being made interchangeable to the required extent to provide for convenient changing of the instruments.

In one form of construction, for template work, etc., provision is made for angular adjustment of the gauge,—thus lines may be scribed on the work at any angle,—the angle of adjustment being first determined approximately by an angle gauge provided on the instrument,—the true angle then being ascertained by the use of Johansson gauges, or the like.

In the accompanying drawings a form of preferred construction of the gauge is shown for the purpose of illustration. Various modifications, amplifications, etc., of the details of arrangement here shown, will occur to those skilled in this art without departing essentially from the spirit and principle of the invention as set forth and comprehended in the appended claims.

In the drawings:

Fig. 1 is a side elevation of my improved gauge, shown as supported on a surface plate and used in connection with an angle plate for supporting the work;

Fig. 2 is an end elevation of the gauge and arrangement shown in Fig. 1;

Fig. 3 is a modification of the gauge with means provided for angular adjustment thereof;

Fig. 4 is a detail view illustrating various kinds of locating and transferring instruments adapted to be used in connection with the gauge, and Fig. 5 illustrates a special locating device adapted to be used with the gauge.

As shown in the drawings, the universal gauge consists of a base 1, adapted to be supported on a surface plate, or other suitable structure A, and having horizontal ways 2 upon which an upright post 3, comprising vertical ways 4, is slidably supported for longitudinal adjustment relative to the horizontal ways,—an instrument holder 5 being slidably operable on the upright post for longitudinal adjustment relative to the vertical ways, thus providing for both horizontal and vertical adjustments, of a locating or transferring instrument D secured in bearing 6 of arm 5, through a wide range of movements relative to the work B, here shown as supported in any suitable manner on an angle plate C.

The horizontal and vertical ways 2 and 4 respectively may be of any suitable construction,— the construction here shown for the purpose of illustrating the invention consisting of the ways 2 and 4 and a tongue-and-groove arrangement 7—8 and 9—10. A bolt 11 and lock nut 12 having a laterally projecting arm 13 are employed in the usual manner for securing the post 3, in any position relative to its longitudinal adjustment, in fixed relation to base 1,—the post being extended at its base to afford suitable bearing support on the ways 2. A bolt 11ª and lock nut 12ª serve to hold the instrument holder in any position of vertical adjustment relative to ways 4.

Adjacent one of the ways 2 is a scale 14 which is preferably mounted on an angle bar 15 secured to base 1 by means of screws 16,—the scale being thus disposed at a more convenient angle for reading,—a vernier scale 14ª secured to the base of post 3 being adapted to cooperate with scale 14 in effecting horizontal adjustments of the gauge. A scale 17 is also provided adjacent the edge of one of the ways 4, being secured to post 3 by means of screws 18,—and cooperating with scale 17 is a vernier scale 17ª secured to the instrument holder 5, thus the instrument holder 5 may be adjusted horizontally relative to scale 14 and vertically relative to scale 17 to any approximately true position within its range of movement.

To find a true position on the work, base 1 is provided with a fixed gauge block 19, and a block 20 adapted to be adjusted longitudinally relative to ways 2 and to be secured thereon in any position by the bolt and lock nut 20ª,—block 20 being connected to the bottom of post 3 by means of a pivoted shaft 21, having a threaded end 22 projecting into block 20 and fitted with a knurled nut 23 operable in a transverse slot 24,—thus providing for final adjustment of post 3 in either direction on base 1,—the true position being found by using Johansson gauges between the fixed block 19 and the base of post 3 as indicated by $a$—$b$ in Fig. 1,—a portion of the tool holder being cut away as indicated at 25 to provide clearance for the blocks adjacent the base of the post.

In like manner, to ascertain a true vertical position, the instrument arm is raised to a position approximating the true position to be found,—Johansson gauges for the exact dimension being then set up between the ways 2 and the lower edge of the instrument arm as indicated between the points $c$—$d$ of Fig. 1. The true position may also be determined by placing the Johannson gauges between the upper edge of the instrument arm and the lower edge of a locating block 26 secured on ways 4 adjacent the upper end of post 3, as indicated at $e$—$f$ Fig. 1.

In Fig. 4 certain instruments, as an automatic center punch D, locating or position indicator E, and scriber F, adapted to be used in connection with the gauge, are illustrated,—each instrument being provided with a hardened, ground and lapped sleeve $d$, $e$, and $f$, respectively, whereby the instruments are adapted to be supported interchangeably and accurately in bearing 6 of instrument arm 5,—thus providing for transferring to the work positions or measurements found by the gauge.

The scriber, as here shown, is provided with a pressure spring $f'$ which serves to hold the point of the instrument against the work with sufficient pressure to scribe a mark on the metal. To adapt the scriber to be used in tool holder—5, the sleeve $f$ is threaded at its opposite ends to receive adjusting nuts—$f^2$ to secure the sleeve in bearing—6 of the tool holder, the free longitudinal movement of the scriber in sleeve—$f$ being limited by a pin—$f^3$ secured in the shank of the scriber and projecting into a slot—$f^4$ in the sleeve. Sleeve—$a$ of the center punch—D has a sliding fit in bearing—6,—thus a center can be punched on the work in the usual manner by striking the punch a hammer blow. Sleeve—$e$ of the position indicator—E also has a sliding fit in bearing —6,—the indicator being secured in the bearing by a lock nut—$e^2$. At its opposite end the sleeve has plate—$e^3$ secured thereto which has a series of radially aligned apertures—$e'$ formed therein adapted to have the end of the shank of the instrument—E inserted therein to take measurements of variable dimensions.

The special instrument illustrated in Fig. 5, consists of the radial arm G having a plug $g$, adapted to fit in bearing 6 of the instrument holder, secured in one end thereof, and a fixed locating plug $g'$ secured in its opposite end. This device is adapted for use in connection with a boring tool or milling machine, and serves to locate true centers without the use of the adjustable button system. In the use of this device the universal gauge, as well as the work, is supported on the mill table,—the device G being supported in bearing 6 of tool holder 5, and an ordinary locating indicator E supported in the mill spindle $h$. A true center may then be located by moving the mill table and arm G until the indicator E reads true at all points on the periphery of plug $g'$. Arm G is then moved out of position, indicator E is removed, to drill and bore the hole from the mill spindle. Other true centers are then found by adjusting the gauge horizontally and vertically and repeating the operation.

In the modified construction illustrated in Fig. 3, provision is made for angular adjustment of the gauge. Thus the base 1 is hinged as at 27 on a sub-base 1ª. Any angle of vertical adjustment may be obtained by setting standard gauges, such as Johansson gauges, between two plug projections 28—29, secured respectively in base 1 and sub-base 1ª as indicated at 30, an indicator or scale 31 being used to first ascertain an approximate adjustment of base 1 to the desired angle. As will be apparent, angular positions may thus readily be found and transferred to the work by the use of a scriber.

From the foregoing detailed description of the construction and use of my improved gauge, its universal adaptability to the general class of tool construction contemplated in its use will be readily understood. It is obvious, of course, that the specific use of the gauge herein illustrated and described serve merely to illustrate its adaptability to this class of work; various modifications and other uses of the gauge will readily suggest themselves to those skilled in this art, but the present showing will serve as a practical illustration of the form and adaptability of the invention as used in the general practice of layout work in tool construction.

Having described my invention, I claim:

1. In a gauge of the character described, the combination with a base having horizontal ways and a scale disposed along said base parallel with the ways; an upright member supported on and adjustable longitudinally of said base and having vertical ways and a scale disposed along said member longitudinally of the vertical ways, and an instrument holder supported on the upright member, adjustable longitudinally of the vertical ways and movable with said member in its longitudinal adjustment on the horizontal ways.

2. In a gauge of the character described, the combination with a base having horizontal ways and a scale disposed along said base parallel with the ways; an upright member supported on and adjustable longitudinally of said base and having vertical ways and a scale disposed along said member longitudinally of the vertical ways, and an instrument holder supported on the upright member, adjustable longitudinally of the vertical ways and movable with said member in its longitudinal adjustment on the horizontal ways, and a plurality of instruments adapted for use in connection with said instrument holder.

3. In a gauge of the character described, the combination with a base having horizontal ways and a scale disposed along said base parallel with the ways; an upright member supported on and adjustable longitudinally of said base and having vertical ways and a scale disposed along said member longitudinally of the vertical ways, and an instrument holder supported on the upright member, adjustable longitudinally of the vertical ways and movable with said member in its longitudinal adjustment on the horizontal ways, and a plurality of instruments adapted for use in connection with said instrument holder, including an indicator adapted to cooperate with a locating plug secured in work supported adjacent said gauge whereby a true center may be located on said work.

4. In a gauge of the character described, the combination with a base having horizontal ways and a scale disposed along said base parallel with the ways; an upright member supported on and adjustable longitudinally of said base and having vertical ways and a scale disposed along said member longitudinally of the vertical ways, and an instrument holder supported on the upright member, adjustable longitudinally of the vertical ways and movable with said member in its longitudinal adjustment on the horizontal ways, and a plurality of instruments adapted for use in connection with said instrument holder, including an indicator and a center punch adapted to be secured interchangeably on the instrument holder and cooperating with a locating device secured on work supported adjacent said gauge whereby a true center may be located and transferred to said work.

5. In a gauge of the character described, the combination with a base having horizontal ways and a scale disposed along said base parallel with the ways; an upright member supported on and adjustable longitudinally of said base and having vertical ways and a scale disposed along said member longitudinally of the vertical ways, and an instrument holder supported on the upright member, adjustable longitudinally of the vertical ways and movable with said member in its longitudinal adjustment on the horizontal ways, and a plurality of instruments adapted for use in connection with said instrument holder, including a scriber secured on the instrument holder whereby a given position ascertained by adjustment thereof may be marked on work supported adjacent the gauge.

6. In a gauge of the character described, the combination with a base having horizontal ways and a scale disposed along said base parallel with the ways; an upright member supported on and adjustable longitudinally of said base and having vertical ways and a scale disposed along said member longitudinally of the vertical ways, and an instrument holder supported on the upright member, adjustable longitudinally of the vertical ways and movable with said member in its longitudinal adjustment on the horizontal ways, and a plurality of instruments adapted for use in connection with said instrument holder, including a radial arm adjustably supported at one end on the instrument holder and having a fixed locating plug secured in its opposite end and co-operating with an indicator supported in a milling machine spindle, whereby a true center may be found relative to work supported adjacent the gauge.

7. In a gauge of the character described, the combination with a base having horizontal ways and a scale disposed parallel with the ways; an upright member supported on and adjustable longitudinally of said base and having vertical ways and a scale disposed along said member longitudinally of the vertical ways, and an instrument holder supported on the upright member, adjustable longitudinally of the vertical ways and movable with the vertical member in its longitudinal adjustment on the horizontal ways, whereby horizontal and vertical adjustments of the gauge may be effected to ascertain approximately positions or dimensions relative to work supported adjacent the gauge, and means including Johansson gauges, whereby true positions or dimensions relative to said work may be found.

8. In a gauge of the character described, the combination with a base having horizontal ways and a scale disposed parallel with the ways; an upright member supported on and adjustable longitudinally of said base and having vertical ways and a scale disposed along said member longitudinally of the vertical ways, and an instrument holder supported on the upright member, adjustable longitudinally of the vertical ways and movable with the vertical member in its longitudinal adjustment on the horizontal ways, whereby horizontal and vertical adjustments of the gauge may be effected to ascertain approximately positions or dimensions relative to work supported adjacent the gauge, and means including Johansson gauges, disposed in both horizontal and vertical relations whereby true positions or dimensions relative to said work may be found.

9. In a gauge of the character described, the combination with a base having horizontal ways and a scale disposed parallel with the ways; an upright member supported on and adjustable longitudinally of said base and having vertical ways and a scale disposed along said member longitudinally of the vertical ways, and an instrument holder supported on the upright member, adjustable longitudinally of the vertical ways and movable with the vertical member in its longitudinal adjustment on the horizontal ways, whereby horizontal and vertical adjustments of the gauge may be effected to ascertain approximately positions or dimensions relative to work supported adjacent the gauge, and means including a locating member, and Johansson gauges, disposed on said horizontal ways between the locating member and said upright member and along said vertical ways between the horizontal ways and the instrument holder, whereby true positions or dimensions relative to said work may be found.

10. In a gauge of the character described, the combination with a base having horizontal ways and a scale disposed parallel with the ways; an upright member supported on and adjustable longitudinally of said base and having vertical ways and a scale disposed along said member longitudinally of the vertical ways, and an instrument holder supported on the upright member, adjustable longitudinally of the vertical ways and movable with the vertical member in its longitudinal adjustment on the horizontal ways, whereby horizontal and vertical adjustments of the gauge may be effected to ascertain approximately positions or dimensions relative to work supported adjacent the gauge, and means including locating members secured respectively on said horizontal and vertical ways, and Johannson gauges, disposed horizontally and vertically relative to said ways and the locating members, whereby true positions or dimensions relative to said work may be found.

11. In a gauge of the character described, the combination of a base adapted for angular vertical adjustment, and having parallel ways and a scale along said ways, a member supported on said base substantially at right angles thereto, adjustable longitudinally thereof and having ways and a scale parallel with said ways, means for supporting a layout instrument on said member whereby angular measurements ascertained by adjustment of said base may be marked on work supported adjacent the gauge.

12. In a gauge of the character described, the combination of a base having parallel ways and a scale along said ways, a member supported on said base, substantially at right angles thereto, adjustable longitudinally thereof and having ways parallel with said member and a scale parallel with its ways, means for supporting a layout instrument on said member and a vernier scale cooperating with one of said scales whereby measurements effected by adjustment of the gauge may be marked on work supported adjacent thereto.

13. In a gauge of the character described, the combination of a base having parallel ways and a scale along said ways, a member supported on said base substantially at right angles thereto, adjustable longitudinally thereof and having ways parallel with said member and a scale parallel with its ways, means for supporting a layout instrument on said member and a vernier scale cooperating with each of said scales whereby horizontal and vertical measurements effected by adjustment of the gauge may be marked on work supported adjacent thereto.

In testimony whereof, I affix my signature.

HENRY H. HUESMAN.